United States Patent
Chen

(10) Patent No.: US 9,997,298 B2
(45) Date of Patent: Jun. 12, 2018

(54) CONDUCTIVE MATERIAL FORMULATION AND USE THEREOF

(71) Applicant: ETERNAL CHEMICAL CO., LTD., Kaohsiung (TW)

(72) Inventor: Shinn-Horng Chen, Kaohsiung (TW)

(73) Assignee: ETERNAL MATERIALS CO., LTD, Kaohsiung (TW)

( * ) Notice: Subject to any disclaimer, the term of this patent is extended or adjusted under 35 U.S.C. 154(b) by 111 days.

(21) Appl. No.: 14/278,311

(22) Filed: May 15, 2014

(65) Prior Publication Data

US 2014/0340820 A1    Nov. 20, 2014

(30) Foreign Application Priority Data

May 20, 2013    (TW) .............................. 102117785 A

(51) Int. Cl.
| | |
|---|---|
| H01G 9/028 | (2006.01) |
| H01G 9/025 | (2006.01) |
| H01G 9/032 | (2006.01) |
| H01G 9/00 | (2006.01) |
| H01G 9/15 | (2006.01) |

(52) U.S. Cl.
CPC ........... *H01G 9/028* (2013.01); *H01G 9/0036* (2013.01); *H01G 9/025* (2013.01); *H01G 9/032* (2013.01); *H01G 9/15* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 2010/0165546 A1* | 7/2010 | Yoshida | H01G 9/0036 361/525 |
| 2011/0190461 A1 | 8/2011 | Kita et al. | |
| 2012/0033349 A1* | 2/2012 | Petrzilek | H01G 9/012 361/525 |
| 2012/0181485 A1* | 7/2012 | Hsu | C08J 3/02 252/500 |

(Continued)

FOREIGN PATENT DOCUMENTS

| | | |
|---|---|---|
| CN | 102751095 A | 10/2012 |
| JP | 9-293639 A | 1/1997 |

(Continued)

OTHER PUBLICATIONS

Non-English Action dated Aug. 31, 2015 for Korean Application No. 10-2014-0060235 with English translation.

(Continued)

*Primary Examiner* — Katie L Hammer
(74) *Attorney, Agent, or Firm* — Ladas & Parry LLP

(57) ABSTRACT

The invention pertains to a conductive material formulation comprising:
(a) a conductive polymer material; and
(b) an insulation material,
wherein the conductive polymer material is derived from a conductive polymer and a polyanion and has a weight average molecular weight ranging from 3,000 to 30,000; and
wherein the (b) insulation material is present in an amount of 0.01 part to 200 parts by weight based on 100 parts by weight of the (a) conductive polymer material. The conductive material formulation according to the invention is useful for the preparation of solid capacitors.

2 Claims, 2 Drawing Sheets

(56) References Cited

U.S. PATENT DOCUMENTS

2013/0170103 A1    7/2013   Chen et al.
2014/0211372 A1    7/2014   Sugawara et al.

FOREIGN PATENT DOCUMENTS

| | | |
|---|---|---|
| JP | 11-67602 A | 3/1999 |
| JP | 2005-146259 A | 6/2005 |
| JP | 2006-5243 A | 1/2006 |
| JP | 2008-109069 A | 5/2008 |
| JP | 2010-43249 A | 2/2010 |
| JP | 2012-524831 A | 10/2012 |
| JP | 2012-241068 A | 12/2012 |
| WO | 2010/123962 A2 | 10/2010 |

OTHER PUBLICATIONS

Espacenet English abstract of JP 2006-5243 A.
Machine translation of cited parts of JP 2006-5243 A.
Espacenet English abstract of CN 102751095 A.
Non-English Action dated Jun. 22, 2015 for Japanese Application No. 2014-103130 with English translation.
Espacenet English abstract of JP 2010-43249 A.
Espacenet English abstract of JP 2012-524831 A.
Espacenet English abstract of JP 11-67602 A.
Espacenet English abstract of JP 2012-241068 A.
Espacenet English abstract of JP 9-293639 A.
Espacenet English abstract of JP 2008-109069 A.
Espacenet English abstract of JP 2005-146259 A.

\* cited by examiner

CONDUCTIVE MATERIAL FORMULATION AND USE THEREOF

BACKGROUND OF THE INVENTION

1. Field of the Invention

The present invention relates to a conductive material formulation, and particularly to a conductive material formulation used in a solid capacitor. The present invention also relates to a solid capacitor using the conductive material formulation.

2. Description of the Related Art

Capacitors are a type of electronic elements widely used in various electronic products. With the development of technologies, the electronic products tend to being miniaturized and lightened. Therefore, the capacitors used in such electronic products are expected to be miniaturized and have a high capacity and a low impedance at high frequency.

In terms of the types of electrolyte, capacitors are classified into the conventional liquid capacitors and the newly developed solid capacitors. In the prior art aluminum liquid capacitor, a liquid electrolyte was used as a charge transfer substance. The main components of the liquid electrolyte include alcohols with high boiling points, ionic liquid, boric acid, phosphoric acid, organic carboxylic acid, ammonium salt, high polar organic solvent, and a small amount of water. In addition to serving as charge transfer substances, the aforementioned components also have a function of patching an alumina dielectric layer on an aluminum foil. When the aluminum metal in inner layer is exposed due to the defects on the alumina dielectric layer, the patching of the alumina dielectric layer would be achieved by the alumina produced from the reaction of the electrolyte with the exposed aluminum metal during the process of charging and discharging of the capacitors. However, although the cost for conventional aluminum liquid capacitors is lower, the use of liquid electrolyte in said capacitors gives rise to disadvantages such as low conductivity and poor high temperature resistance. Moreover, during the generation of alumina, hydrogen is also generated. The accumulation of excessive hydrogen in the capacitor would cause capacitor rupture and damage the electronic products. Although a hydrogen absorbing agent may be added to the liquid electrolyte to reduce the risk of capacity rupture, the problem is not fundamentally eliminated. The application of conventional liquid electrolyte is limited due to its high equivalent series resistance (ESR) regardless of its high capacity.

In view of the foregoing, a new generation of solid capacitor is developed, in which the liquid electrolyte is replaced by a solid electrolyte. Conductive polymers are one of the developed solid electrolyte. The conductivity of the conductive polymers comes from the holes created by blending the anions of an oxidant into the structure of the polymer as a dopant. Compared with a liquid electrolyte or a solid semiconductor complexing salt such as tetracyanoquinodimethane (TCNQ) complex salt and inorganic semiconductor $MnO_2$ used in a conventional electrolyte capacitor, the conductive polymer has higher conductivity and a suitable high-temperature insulation property. Therefore, the conductive polymer has led the trend of developing the solid electrolyte for the use in current electrolyte capacitors.

In addition to a longer life time which is 6 times longer than that of a general capacitor, solid capacitors also have improved stability and capacitances which does not tend to be influenced by the ambient temperature and humidity. Additionally, the solid capacitor has advantages such as a low ESR, a low capacitance variation rate, an excellent frequency response (high frequency resistance), a high temperature resistance, and a high current resistance, and the problem of leakage and plasma explosion is eliminated.

Jesse S. Shaffer et al. disclose a method of using a conductive polymer in an electrolyte of an electrolytic capacitor for the first time in U.S. Pat. No. 4,609,971. The method includes immersing an anode aluminum foil of a capacitor in a mixture solution formed by a conductive polymer polyaniline powder and a dopant $LiClO_4$, and then removing a solvent on the aluminum foil. Due to the excessively great molecular size of polyaniline, it cannot penetrate into the micropores of the anode foil. The impregnation rate of the capacitor obtained through this method is poor, and the impedance is high. In order to facilitate the penetration of the polymer into the micropores of the anode foil, Gerhard Hellwig et al disclose a chemical oxidation polymerization method of using a conductive polymer as the electrolyte of a capacitor in U.S. Pat. No. 4,803,596. The method includes respectively immersing a capacitor in a solution of a conductive polymer monomer and an oxidant, and polymerizing the conductive polymer monomer under a suitable condition, in which the conductive polymer electrolyte is accumulated to a sufficient thickness through multiple immersions. Thereafter, Friedrich Jonas et al. of the Bayer Corporation in Germany disclose a method of manufacturing an aluminum solid capacitor with poly-3,4-ethylenedioxythiophene (PEDOT) as an electrolyte by using a 3,4-ethylenedioxythiophene (EDOT) monomer in combination with an oxidant, iron (III) p-toluenesulfonate, for the first time in U.S. Pat. No. 4,910,645. In addition, it is found that 3,4-ethylenedithiathiophene (EDTT) which has a similar structure with EDOT may be transformed into an electrically active polymer (Lambertus Groenendaal et al. *Adv. Mater.* 2000, 12, No. 7).

The conductive polymer PEDOT has advantages such as a high heat resistance, a high conductivity, a high charge transfer velocity, being toxicity-free, a long lifetime, and no occurrence of capacitor rupture when being applied to a capacitor. PEDOT is prepared by performing the polymerization of EDOT monomer and iron p-toluenesulfonate directly in capacitors. Said process belongs to an in situ reaction and may be performed by a one-liquid method, a two-liquid method or a multi-liquid method classified in terms of the immersion process. The one-liquid method includes immersing capacitor elements in a mixed solution of EDOT and iron p-toluenesulfonate prior to a heat polymerization. The two-liquid method includes immersing capacitor elements respectively in EDOT and iron p-toluenesulfonate prior to a heat polymerization. However, in the one-liquid method, careful control of the process parameters is required so as to prevent EDOT from polymerization before the immersion, and the two-liquid method subjects to solution contamination problems.

In addition, the PEDOT resulting from the in situ polymerization on the surface or in the pores of the dielectric layer on the anode foil has a powder structure, and such powder structure tends to have a low degree of polymerization, poor physical properties, easy shedding due to poor adhesion on the electrode surface or surface pores and limited tolerant operating voltage. Due to such disadvantages of the powder structure of PEDOT, a solid capacitor of 16 V or more cannot be achieved.

To solve the foregoing problems, Stephan Kirchmeyer et al. proposed a non-w situ polymerization to synthesize conductive polymers (*J. Mater. Chem.* 2005, 15, 2077-2088), however, the conductive polymer synthesized by non-w situ polymerization generally has disadvantages such as short repeating units (about 6 to 18 repeating units) and a low degree of polymerization (a weight average molecular weight of about 2500 or less). Due to the poor physical properties resulting from a low degree of polymerization, polymers with a low degree of polymerization cannot be used for a high voltage operational environment.

Therefore, in order to satisfy the requirements of miniaturization, high capacity, high temperature resistance and high frequency, a conducting material which has improved physical properties and can be applied to solid capacitors with a higher voltage resistance and better stability is expected to be a substitute for conventional liquid capacitors.

Provided is a solid capacitor having a solid electrolyte with improved physical properties to reduce the chance of electron breakthrough, enhance the insulation between the cathode and anode in the solid capacitor and improve the withstand voltage of the solid capacitor.

SUMMARY OF THE INVENTION

In an aspect, provided is a conductive material formulation, comprising: (a) a conductive polymer material and (b) an insulation material.

In another aspect, provided is a solid capacitor, comprising:
an anode;
a dielectric layer, formed on the anode;
a cathode; and
a solid electrolyte, located between the dielectric layer and the cathode,
wherein the solid electrolyte comprises the conductive material formulation according to the present invention.

DETAILED DESCRIPTION OF THE INVENTION

Figure 1:
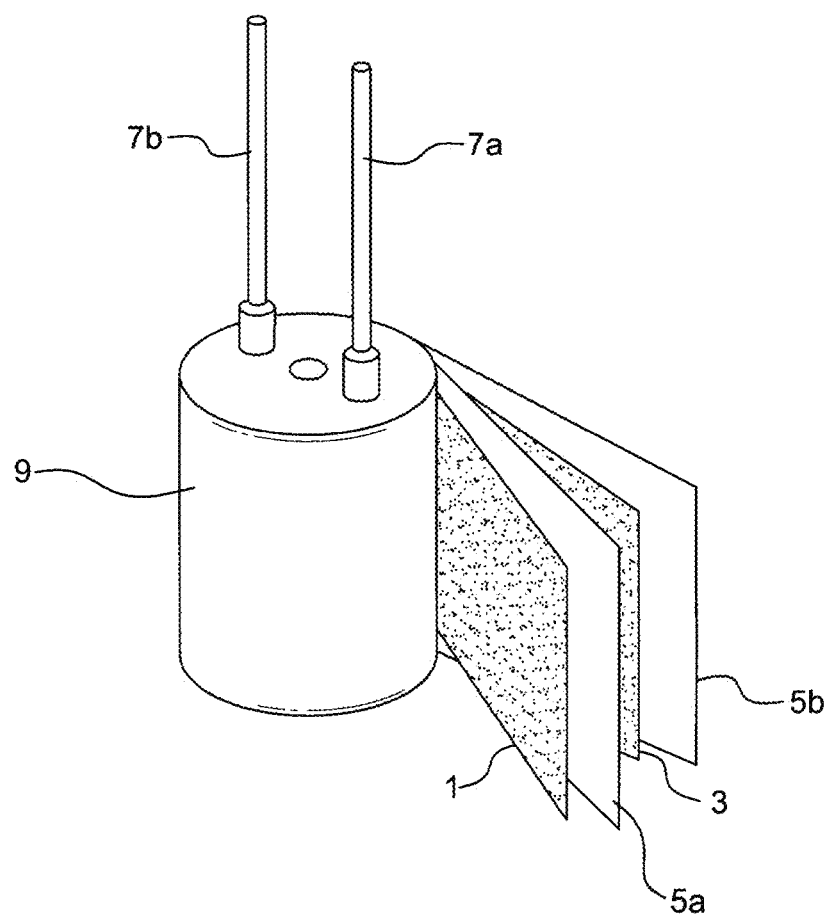
FIG. 1 illustrates a conventional solid capacitor assembly.

To facilitate the understanding of the disclosure herein, terms will be defined in the following.

The term "about" refers to an acceptable deviation of a given value as measured by those skilled in the art, depending, in part, on how to measure or determine the value.

The term "alkyl" refers to a straight or branched carbon chain group. In certain embodiments, alkyl is the carbon chain group having 1 to 20 carbon atoms ($C_{1-20}$), 1 to 15 carbon atoms ($C_{1-15}$), 1 to 10 carbon atoms ($C_{1-10}$) or 1 to 6 carbon atoms ($C_{1-6}$). The examples of alkyl include, but not limited to, methyl, ethyl, propyl (including all of the isomeric forms), butyl (including all of the isomeric forms), pentyl (including all of the isomeric forms) and hexyl (including all of the isomeric forms).

The term "alkylene" refers to a straight or branched divalent carbon chain group. In certain embodiments, alkylene is the carbon chain group having 1 to 4 carbon atoms ($C_{1-4}$). The examples of alkylene include, but not limited to, methylene, ethylene, propylene (including all of the isomeric forms), and butylene (including all of the isomeric forms).

The term "alkoxy" refers to alkyl, as mentioned hereinabove, attached to the rest of molecule, via oxygen atom. The examples of alkoxy include, but not limited to, methoxy, ethoxy, propoxy, n-propoxy, 2-propoxy, n-butoxy, isobutoxy, and tert-butoxy.

The term "aryl" refers to a monocyclic or polycyclic, univalent aromatic group. In certain embodiments, aryl has 6 to 20 ring atoms ($C_{6-20}$), 6 to 15 ring atoms ($C_{6-15}$) or 6 to 10 ring atoms ($C_{6-10}$). The examples of aryl include, but not limited to, phenyl, naphthyl, fluorenyl, azulenyl, anthryl, phenanthryl, pyrenyl, biphenylyl and terphenylyl. Aryl also refers to a bicyclic or tricyclic carbon ring, one of whose rings is an aromatic ring and the rest is a saturated, partial unsaturated or aromatic ring, for example, dihydronaphthyl, indenyl, dihydroindenyl or tetrohydronaphthyl (tetralinyl).

In the following, some embodiments according to the present invention will be described in detail; but the present invention may be implemented in various aspects without deviation from the spirit of the present invention, and the scope of the present invention should not be construed as limitation to that described in the specification. Moreover, unless otherwise specified herein, the expressions "a/an", "the" and the like as used in the specification (specially in appended claims) should be considered as comprising singular and plural forms, and the word "substituted" refers to the substitution of hydrogen with a substituent. Also, for the purpose of clarity, each of components and regions may be exaggerated in size in the figures and were not drawn to a scale.

The Conductive Material Formulation

The conductive material formulation of the present invention comprises: (a) a conductive polymer material, and (b) an insulation material.

The Conductive Polymer Material

The conductive polymer material according to the present invention is derived from a conductive polymer and polyanion, wherein the conductive polymer comprises a polymerization unit derived from a monomer of formula (I):

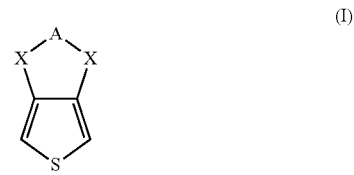

wherein A is $C_1$ to $C_4$ alkylene substituted with $(R)_p$; X is O or S; R is H, unsubstituted or substituted $C_1$ to $C_{20}$ alkyl or alkoxy, or unsubstituted or substituted $C_6$ to $C_{20}$ aryl; and p is 0, 1 or 2.

The monomer of formula (I) preferably includes, but not limited to,

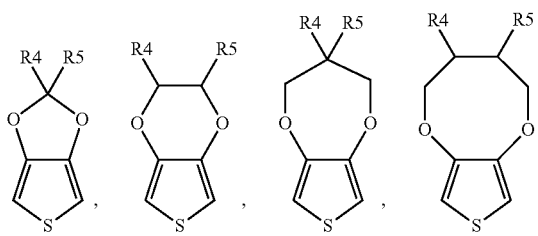

or a combination thereof, wherein each of R4 and R5 is independently H, unsubstituted or substituted $C_1$ to $C_{15}$ alkyl or alkoxy, or unsubstituted or substituted $C_6$ to $C_{15}$ aryl; preferably, each of $R_4$ and $R_5$ is independently H or $C_1$ to $C_3$ alkyl or alkoxy.

According to a specific embodiment of the present invention, the monomer of formula (I) can be, but not limited to,

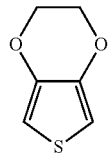

(3,4-ethylenedioxythiophene, EDOT),

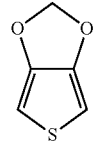

(thieno[3,4-d][1,3]dioxole) or

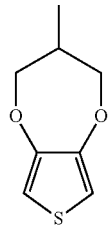

(3-methyl-3,4-dihydro-2H-thieno[3,4-b][1,4]dioxepine) or a combination thereof.

The conductive polymer may be homopolymer or copolymer. In addition to being used alone as a polymerization monomer to form the conductive polymer, the monomer of formula (I) may be used in combination with the other monomers (for example, the monomer of formula (II) below).

According to a preferred embodiment of the present invention, for improving the degree of polymerization of the conductive polymer and the capacity thereof, the conductive polymer further comprises the polymerization unit derived from the monomer of formula (II):

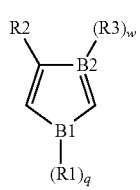

wherein, B1 is O, S or N; B2 is N or C; each of R1, R2 and R3 is independently H, unsubstituted or substituted $C_1$ to $C_{20}$ alkyl or alkoxy, or unsubstituted or substituted $C_6$ to $C_{20}$ aryl; and, each of q and w is independently 0 or 1 (when B1 is O or S, q is 0; and when B2 is N, w is 0).

The monomer of formula (II) preferably includes, but not limited to,

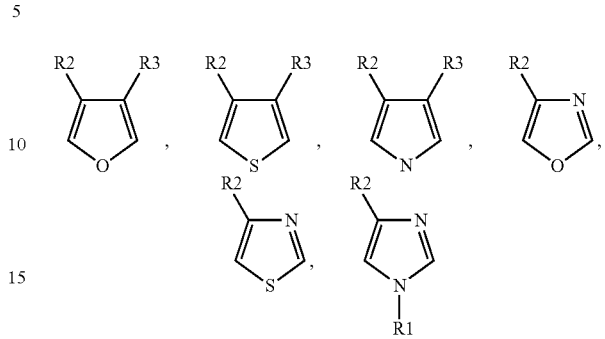

or a combination thereof, wherein each of R1, R2 and R3 is independently H or $C_1$ to $C_3$ alkyl or alkoxy.

In some embodiments of the present invention, the monomer of formula (II) includes, but not limited to,

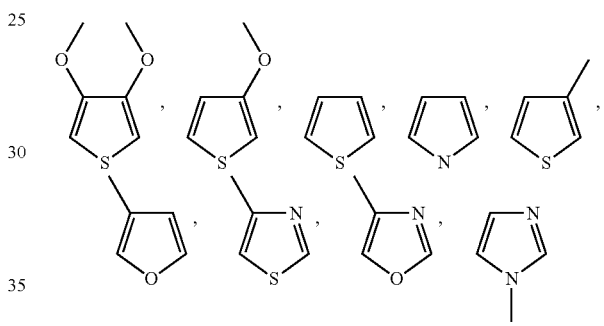

or a combination thereof.

The conductive polymer of the present invention has a high degree of polymerization and a weight average molecular weight in the range from 3,000 to 30,000, preferably in the range from 4,000 to 18,000, and more preferably in the range from 5,000 to 16,000.

For the formation of the conductive polymer according to the present invention, the ratio of the monomer of formula (I) to the monomer of formula (II) is not specifically limited. The ratio may be adjusted as needed. If the monomer of formula (II) is used in an excessive amount, the capacity of the solid capacitor used will be negatively affected. Therefore, in general, if the monomer of formula (II) presents, the monomer of formula (II) is used in an amount of about 1 to about 800 parts by weight, and preferably about 5 to about 400 parts by weight based on 100 parts by weight of the monomer of formula (I). In some embodiments of the present invention, the monomer of formula (II) is used in an amount of about 5 to about 50 parts by weight, based on 100 parts by weight of the monomer of formula (I).

There is no specific limitation to the polyanions used in the present invention. The polyanions used in the present invention may be those known in the art. The use of these polyanions for polymerization renders the originally water-insoluble polythiophene compounds dispersible or hydratable. The polyanions used in the present invention may be acidic polymers in the form of free acid, for example, but not limited to: polycarboxylic acid, polysulfonic acid or a combination thereof. The polycarboxylic acid may be for example polyacrylic acid, polymethacrylic acid or polymaliec acid. The polysulfonic acid may be for example polystyrenesulfonic acid or polyvinylsulfonic acid. In terms of the conductivity, polystyrenesulfonic acid is most preferred. The polyanion in the form of salts having free acid moiety neutralized may be used in the present invention.

There is no special limitation on the molecular weight of the polycarboxylic acid or polysulfonic acid for being used as polyanions. For conductivity, the weight average molecular weight is preferably in the range of about 10,000 to about 150,000, and more preferably in the range of about 70,000 to about 100,000.

According to the present invention, the weight ratio of the conductive polymer to polyanion is in the range of about 0.05 to about 10, preferably in the range of about 0.1 to about 8, and more preferably in the range of about 0.2 to about 5.

The conductive polymer material according to the present invention has a size in the range of about 10 to about 1000 nanometers, preferably in the range of about 30 to about 500 nanometers, and more preferably in the range of about 50 to about 300 nanometers.

The conductive polymer material according to the present invention has a value of surface resistance in the range of about 100 to about 1,000Ω/□ (Ω/□ represents ohm/square), preferably in the range of about 150 to about 850Ω/□, and more preferably in the range of about 200 to about 750 Ω/□.

The Insulation Material

The insulation material according to the present invention may be used as another dielectric layer (for example, D1 in FIG. 3) to function as a protective layer for the structure of the solid capacitor material. The insulation between the cathode and anode in the solid capacitor is improved, the chance of electron breakthrough is reduced, and the withstand voltage of the solid capacitor is increased. The insulation material according to the present invention has a resistivity of $10^3$ to $10^{12}$ Ω·m and is selected from an inorganic oxide, a non-conjugated polymer and a combination thereof.

The inorganic oxide includes the oxide of at least one of elements selected from the group consisting of lithium, sodium, potassium, calcium, titanium, zinc, zirconium, antimony, indium, tin, aluminum, iron and silicon, preferably of titanium, zinc, indium, tin, aluminum and silicon. According to a specific embodiment of the present invention, the inorganic oxide may be titanium dioxide, alumina, zinc oxide, indium tin oxide and silica.

The non-conjugated polymer refers to a polymer without alternating single bonds and double bonds in structure. The non-conjugated polymer is derived from one or more of monomer, oligomer or polymer, and is preferably selected from the group consisting of epoxy monomer, epoxy oligomer, epoxy resin, polyethylene, polypropylene, polyvinyl alcohol, polyvinyl chloride, polyurethane, polyimide, carboxymethyl cellulose, polyethylene glycol, polyacrylamide and TEFLON® brand polytetrafluoroethylene.

According to the present invention, the (b) insulation material has a content of about 0.01 to about 200 parts by weight, preferably about 0.1 to about 50 parts by weight and more preferably about 1 to about 20 parts by weight, based on 100 parts by weight of the (a) conductive polymer material.

The conductive material formulation according to the present invention comprises (a) a conductive polymer material and (b) an insulation material. There is no chemical reaction between them. The conductive polymer material has a good heat resistance, high electrical conductivity, fast charge transmission, a long lifetime, and no occurrence of capacitor rupture when being applied to a capacitor and is toxicity-free. Moreover, the conductive polymer material according to the present invention has a size of nanometer order, high molecular weight and excellent electrical conductivity, and thus may be effectively filled onto the surface or into the pores of the dielectric layer on the anode foil. The solid capacitor prepared from the conductive polymer material according to the present invention alone has a high withstand voltage (180 V voltage or more) and a high capacity. The insulation material improves the insulation between the cathode and anode in the solid capacitor, reduces the chance of electron breakthrough and increases the withstand voltage of the solid capacitor. Therefore, the solid capacitor prepared from the conductive material formulation according to the present invention may be used in an operational environment of higher voltage, 200 V voltage or more, preferably of 270 V or more.

Preparation of the Conductive Polymer Material

The present application also provides a method for preparing the aforementioned conductive polymer material, comprising the following steps:

(a) mixing the monomer of formula (I),

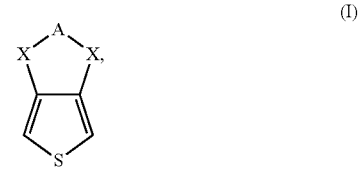

and
optionally the monomer of formula (II)

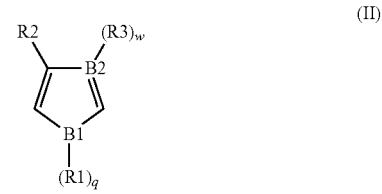

with a polyanion,
wherein,
A is $C_1$ to $C_4$ alkylene substituted with $(R)_p$,
X is O or S,
B1 is O, S or N,
B2 is N or C,
each of R1, R2, R3 and R is independently H, unsubstituted or substituted $C_1$ to $C_{20}$ alkyl or alkoxy, or unsubstituted or substituted $C_6$ to $C_{20}$ aryl,
p is 0, 1 or 2, and
each of q and w is independently 0 or 1;
(b) subjecting the mixture from Step (a) to a first supersonic vibration to form micelles;
(c) adding an oxidizing agent to enable the oxidation polymerization of the monomers to take place based on polyanion serving as a template and form a composite with the polyanion; and
(d) subjecting the product obtained in step (c) to a second supersonic vibration.

The types, preferable forms and dosages of the monomer of formula (I), the monomer of formula (II) and polyanion used in Step (a) are as defined hereinbefore.

According to the present invention, step (a) may be carried out at the room temperature. The polyanion is an acidic polymer in a free form and is produced by the addition of an acidic polymer to a solvent to provide a solution and the dissociation of the acidic polymer in the solution. The acidic polymer is as defined hereinbefore.

The solvents which may be used in the present invention are not specifically limited, including, but not limited to, for example water, alcohols, benzene or a combination thereof, preferably methanol, ethanol, propanol, n-butanol, tert-butanol, water or a combination thereof, and more preferably water.

In the present invention, polyanions may be used as a template. Polyanions are fully mixed with the monomer of formula (I) and optionally the monomer of formula (II), and the mixture is subjected to a first supersonic vibration to form micelles encapsulating the monomer.

The micelles prepared by Step (a) in the present invention are in a micrometer order or greater. However, oversized micelles would give rise to oversized conductive polymers, which have difficulties in penetrating into the micro-pores of the electrode foil during immersion. The inventor of the present invention performed the first supersonic vibration (Step (b)) and the second supersonic vibration (Step (d)) respectively in an ice bath (at a temperature of about 0° C.). The size of the polymer material is desirably reduced to a nanometer order, and a conductive polymer material with excellent electrical conductivity is obtained.

In Step (b) of the present invention, the size of the micelles is reduced by the first supersonic vibration before the oxidation polymerization. If supersonic vibration is performed after the oxidation polymerization, the size of the formed polymer material may not reach the nanometer order.

The first supersonic vibration has a frequency in the range of about 10 kHz to about 50 kHz, and preferably in the range of about 20 kHz to about 40 kHz. The first supersonic vibration lasts for a period of time in the range of about 1 minute to 100 minutes and preferably in the range of about 20 minutes to about 40 minutes.

In Step (c), a conductive polymer may be formed by subjecting the monomers to an oxidation polymerization in the presence of an oxidizing agent. Since the resulting conductive polymer carries positive charge resulting from the oxidation polymerization, it may form a polymer material with polyanions carrying negative charges.

There is no special limitation to the oxidizing agent used in the present invention. The oxidizing agent may be well known by those skilled in the art, for example, but not limited to: alkali persulfates, ammonium salts, peroxides, ferric iron salts of organic acids or a combination thereof, and preferably iron p-toluenesulfonate, ammonium sulfate, ammonium per sulfate, ammonium oxalate, ammonium perchlorate, hydrogen peroxide or a mixture thereof, and more preferably iron p-toluenesulfonate or hydrogen peroxide. According to the embodiment of the present invention, the oxidizing agent used in the present invention is hydrogen peroxide.

The oxidizing agent is used at an amount in the range of about 5 to about 3000 parts by weight, preferably of about 50 to about 1000 parts by weight, most preferably of about 100 to about 300 parts by weight, based on 100 parts by weight of total of the monomers (the monomer of formula (I) and optionally the monomer of formula (II)).

Generally, the conductive polymers prepared by non-in situ polymerization do not have a high degree of polymerization and has a weight average molecular weight of 2500 or less. In contrast, the conductive polymer according to the present invention has a high degree of polymerization and a weight average molecular weight in the range of 3,000 to 30,000, preferably of 5,000 to 16,000.

In the present invention, the size of the polymer material obtained from Step (c) is further reduced by the second supersonic vibration in Step (d). The conductive high polymer may be exposed outside the template in favor of the effective filling onto the surface or into the pores of the dielectric layer during the subsequent immersion of the capacitor.

The second supersonic vibration has a frequency in the range of about 10 kHz to about 50 kHz, and preferably in the range of about 20 kHz to about 40 kHz. The second time supersonic vibration lasts for a period of time in the range of about 1 minute to 100 minutes and preferably in the range of about 20 minutes to about 40 minutes.

The conductive polymer material prepared by the method of the present invention has a size in the range of about 10 to about 1000 nanometers, preferably in the range of about 30 to about 500 nanometers, and more preferably in the range of about 50 to about 300 nanometers.

There is no special limitation to the method for immersing a capacitor body into the conductive material formulation of the present invention. For example, the conductive polymer material may be mixed with the insulation material and formulated into a single solution for the immersion of a capacitor body. Alternatively, the capacitor body may be immersed into the conductive polymer material solution and into the insulation material solution respectively, without precedence order. It is immersed for a desired period of time, taken out, and heated to dryness at a specific temperature. The previous steps may be repeated for several times to form a solid electrolyte. There is no limitation to the solvents used in the previous solution. For example, the solvent includes, but not limited to, water, alcohols, benzenes, alkanes, ketones or a combination thereof, and preferably methanol, ethanol, propanol, n-butanol, tert-butanol, 2-butanone (methylethylketone), water or a combination thereof, and more preferably water. Therefore, the solid electrolyte according to the present invention reduces the chance of electronic breakthrough chance in operation and increases the withstand voltage of the solid capacitor.

In contrast to the in situ process, the present invention prepares the conductive polymer material prior to immersion. Therefore, the degree of polymerization of the polymer material in the process may be controlled easily, and disadvantages associated with an in situ process such as the one-liquid or two-liquid method, are eliminated. For example, careful control of the process parameters during immersion may be no longer required in the present invention.

The present invention further provides a solid capacitor, comprising: an anode; a dielectric layer formed on the anode; a cathode; and a solid electrolyte between the dielectric layer and the cathode, wherein the solid electrolyte comprises the conductive material formulation according to the present invention, wherein the conductive material formulation comprises an insulation material.

In particular, as the main body of the solid capacitor, an anode is formed by using an etched conductive metal foil as an anode foil, subjecting the surface of the anode foil to an anode oxidation and drawing a wire from the anode foil; and the cathode is formed by using another metal foil as a cathode foil and drawing a wire from the cathode foil. The dielectric layer composed of oxide or the like is formed on the surface of the anode foil and between the anode foil and cathode foil. The anode foil and cathode foil consists of aluminum, tantalum, niobium, aluminum oxide, tantalum oxide, niobium oxide, titanium-coated aluminum or carbon-coated aluminum. After the anode film and cathode film are wound into the cylinder, the capacitor body is immersed into the mixture of the conductive polymer material and the insulation material, and the steps such as removal by suction and heating are used to remove the solvent. The foregoing steps may be optionally repeated for two or three times or more. Alternatively, the capacitor body is immersed into one of the conductive polymer material and insulation material for a desired period of time, and then the steps such as removal by suction and heating are used to remove the solvent. The foregoing steps may be optionally repeated for two or three times or more. The capacitor body is further immersed into another of the conductive polymer material and insulation material of the present invention, and then the steps such as removal by suction and heating are used to remove the solvent. The foregoing steps may be optionally repeated for two or three times or more. A solid electrolyte between the dielectric layer and cathode foil of the solid capacitor is formed.

The solid capacitor may be the aluminum, tantalum, or niobium solid capacitor.

After the formation of a solid electrolyte within the capacitor assembly, a solid capacitor may be formed by conventional technologies and from conventional materials. For example, the capacitor assembly may be installed into a box having a bottom, and a seal element with an opening for exposing the wires may be disposed at the top of the box. A solid capacitor is formed after being sealed.

In the following, the methods for manufacturing conventional solid capacitors and the solid capacitor of the preferable embodiments of the present invention will be illustrated by figures, which are not intended to limit the scope of the present invention. Modifications and alterations, readily achieved by those skilled in the art, will be encompassed within the disclosure of the specification.

FIG. 1 shows a conventional solid capacitor assembly. As shown in FIG. 1, the anode foil 1 and the cathode foil 3 are wound together with the spacer components 5a and 5b to form the capacitor assembly 9. The lead wires 7a and 7b were used as the terminals for connection of the cathode foil 3 and anode foil 1 with the external wires, respectively.

The numbers of the wires for connection to the cathode foil and anode foil are not specifically limited as long as both the cathode foil and anode foil are connected with wires. The number of the cathode foil and anode foil are not specifically limited. For example, the number of the cathode foil may be the same as, or more than that of the anode foil. The dielectric layer (not shown) composed of oxides or the like is formed on the surface of the anode foil, and is situated between the anode foil and cathode foil. The anode foil 1, the cathode foil 3, the spacer components 5a and 5b, and the lead wires 7a and 7b, are made from known materials by known technologies.

Figure 2:
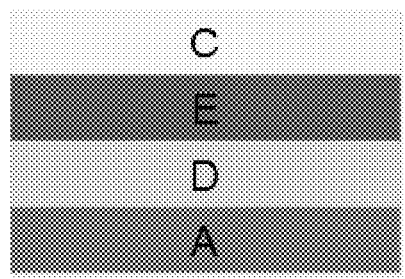
FIG. 2 illustrates a conventional solid capacitor.

As shown in FIG. 2, a conventional solid capacitor comprises: an anode (A); a dielectric layer (D) formed on the anode (A); a solid electrolyte (E); and a cathode (C), wherein the solid electrolyte between the dielectric layer and cathode foil of the solid capacitor is formed by immersing the capacitor assembly 9 into a conventional conductive polymer material.

Figure 3:
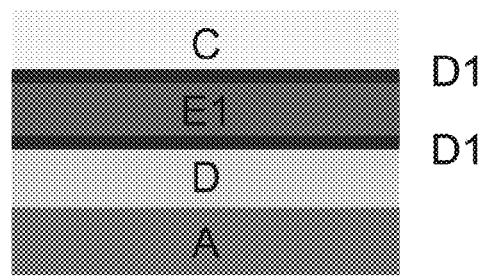
FIG. 3 illustrates a solid capacitor of an embodiment according to the present invention.

In an embodiment of the present invention, the capacitor assembly 9 is immersed in the insulation material, and heated to dryness at a high temperature to form insulation material layers respectively on the surface of cathode and of the dielectric layer. The capacitor assembly 9 is immersed in the conductive polymer material, and heated to dryness at a high temperature to form a solid electrolyte layer. The solid capacitor of the present invention, as shown in FIG. 3 is formed after configuring and sealing the following components in sequence: the anode (A); the dielectric layer (D); the insulation material (D1); the conductive polymer material (E1); the insulation material (D1); and the cathode (C).

Figure 4:
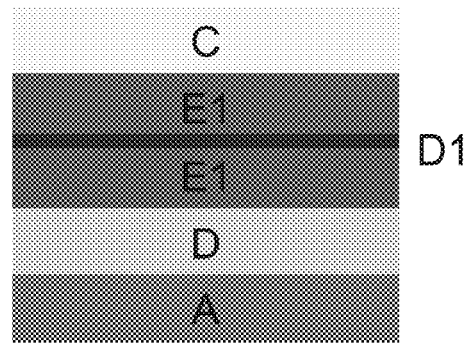
FIG. 4 illustrates a solid capacitor of an embodiment according to the present invention.

In an embodiment of the present invention, the capacitor assembly 9 is immersed in the conductive polymer material, and heated to dryness at a high temperature to form conductive polymer material layers respectively on the surface of cathode and of the dielectric layer. The capacitor assembly 9 is immersed in the insulation material, and heated to dryness at a high temperature to form a solid electrolyte layer. The solid capacitor of the present invention, as shown in FIG. 4, is formed after configuring and sealing the following components in sequence: the anode (A); the dielectric layer (D); the conductive polymer material (E1); the insulation material (D1); the conductive polymer material (E1); and the cathode (C).

Figure 5:
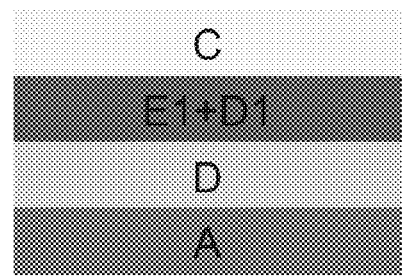
FIG. 5 illustrates a solid capacitor of an embodiment according to the present invention.

In an embodiment of the present invention, the capacitor assembly 9 is immersed in the mixture of the conductive polymer material and the insulation material, and heated to dryness at a high temperature to form a solid electrolyte layer. A solid capacitor of the present invention, as shown in FIG. 5, is formed after configuring and sealing the following components in sequence: the anode (A); the dielectric layer (D); the mixture of the conductive polymer material (E1) and the insulation material (D1); and the cathode (C).

The solid capacitor made by the present invention has a high withstand voltage and high capacity, and may be used as one have a withstand voltage of 270 V or more. The present invention satisfies the requirements directed to the properties of the solid capacitor required in the industry. Therefore, the solid capacitor of the present invention may be widely used in the industries in need of high-voltage capacitors, for example, the driving power for LED lamp, the electronic energy-saving lamp and the rectifier, the electronic devices for vehicle, the computer motherboard, the frequency converter, network communication, medical equipment power, UPS and other advanced field.

The present invention will be further exemplified in the following embodiments, which will be illustrative of the present invention but not impart any limitation to the scope of the present invention. Modifications and alterations, readily achieved by those skilled in the art, will be encompassed within the disclosure of the specification and the scope of the appended claims.

EXAMPLE

Preparation of the Solid Capacitor

Example 1

1 g

was added into 0.3 g polystyrenesulfonic acid [Alfa Acsar, CAS NO:28210-41-5, 30% aq. Mw: 75000] in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 kHz for 30 minutes, to give the conductive polymer material 1.

0.5 g

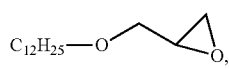

0.3 g

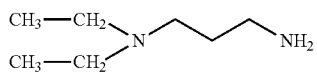

as a curing agent and 0.01 g

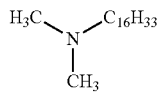

as a catalyst were dissolved in 20 g methanol, to give the insulation material 1.

The capacitor assembly 9 as shown in FIG. 1 was immersed in the conductive polymer material 1 for 5 minutes and was taken out and heated to dryness at the temperature of 130° C. The previous steps were repeated for 3 times. The capacitor assembly 9 was immersed into the insulation material 1 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 2

1 g

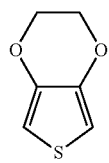

was added into 3.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 2.

0.5 g

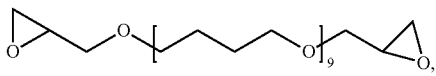

0.3 g

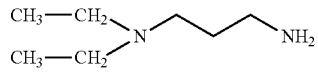

as a curing agent and 0.01 g

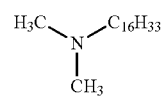

as a catalyst were dissolved in 20 g methanol, to give the insulation material 2.

The capacitor assembly 9 as shown in FIG. 1 was immersed in the conductive polymer material 2 for 5 minutes and was taken out and heated to dryness at the temperature of 130° C. The previous steps were repeated for 3 times. The capacitor assembly 9 was immersed into the insulation material 2 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 3

0.9 g

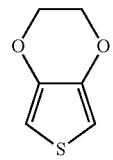

and 0.1 g

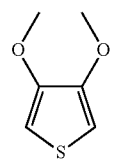

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 3.

0.1 g polyethylene glycol was dissolved in 10 g water to give the insulation material 3.

The capacitor assembly 9 as shown in FIG. 1 was immersed in the insulation material 3 for 5 minutes and was taken out and heated to dryness at the temperature of 130° C. The previous steps were repeated for 3 times. The capacitor assembly 9 was immersed into the conductive polymer material 3 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 4

0.9 g

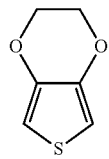

and 0.1 g

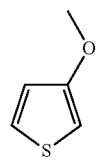

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 4.

0.1 g polyethylene glycol was dissolved in 10 g benzene to give the insulation material 4.

The capacitor assembly 9 as shown in FIG. 1 was immersed in the insulation material 4 for 5 minutes and was taken out and heated to dryness at the temperature of 130° C. The previous steps were repeated for 3 times. The capacitor assembly 9 was immersed into the conductive polymer material 4 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 5

0.9 g

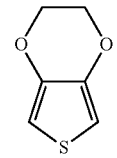

and 0.1 g

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 5.

1 g polyurethane was dissolved in 10 g tetrahydrofuran to give the insulation material 5.

The capacitor assembly 9 as shown in FIG. 1 was immersed in the mixture solution of the conductive polymer material 5 and the insulation material 5 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 6

0.9 g

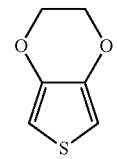

and 0.1 g

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 6.

0.2 g polyimide was dissolved in 10 g tetrahydrofuran to give the insulation material 6.

The capacitor assembly 9 as shown in FIG. 1 was immersed in the mixture solution of the conductive polymer material 6 and the insulation material 6 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 7

0.9 g

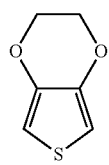

and 0.1 g

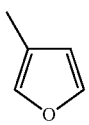

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 7.

0.2 g carboxymethyl cellulose was dissolved in 15 g water to give the insulation material 7.

The capacitor assembly 9 as shown in FIG. 1 was immersed in the conductive polymer material 7 for 5 minutes and was taken out and heated to dryness at the temperature of 130° C. The previous steps were repeated for 3 times. The capacitor assembly 9 was immersed into the insulation material 7 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 8

0.9 g

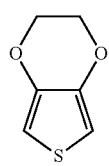

and 0.1 g

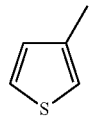

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 8.

0.2 g carboxymethyl cellulose was dispersed in 10 g water to give the insulation material 8.

The capacitor assembly 9 as shown in FIG. 1 was immersed in the conductive polymer material 8 for 5 minutes and was taken out and heated to dryness at the temperature of 130° C. The previous steps were repeated for 3 times. The capacitor assembly 9 was immersed into the insulation material 8 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 9

0.9 g

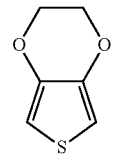

and 0.1 g

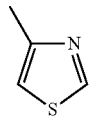

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 9.

0.01 g polyvinyl alcohol was dissolved in 10 g water to give the insulation material 9.

The capacitor assembly 9 as shown in FIG. 1 was immersed in the conductive polymer material 9 for 5 minutes and was taken out and heated to dryness at the temperature of 130° C. The previous steps were repeated for 3 times. The capacitor assembly 9 was immersed into the insulation material 9 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 10

0.9 g

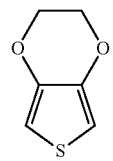

and 0.1 g

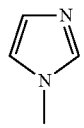

were added into 3.3 g polystyrenesulfonic acid in 100 ml water and stirred uniformly and then were subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 10.

0.1 g polyacrylamide was dissolved in 10 g water to give the insulation material 10.

The capacitor assembly 9 as shown in FIG. 1 was immersed in the insulation material 10 for 5 minutes and was taken out and heated to dryness at the temperature of 130° C. The previous steps were repeated for 3 times. The capacitor assembly 9 was immersed into the conductive polymer material 10 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 11

1 g

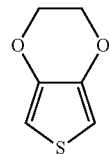

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 11.

0.5 g titanium dioxide was dispersed in 20 g water to give the insulation material 11.

The capacitor assembly 9 as shown in FIG. 1 was immersed in the insulation material 11 for 5 minutes and was taken out and heated to dryness at the temperature of 130° C. The previous steps were repeated for 3 times. The capacitor assembly 9 was immersed into the conductive polymer material 11 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 12

1 g

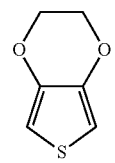

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 12.

0.1 g silica was dispersed in 20 g water to give the insulation material 12.

The capacitor assembly 9 as shown in FIG. 1 was immersed in the conductive polymer material 12 for 5 minutes and was taken out and heated to dryness at the temperature of 130° C. The previous steps were repeated for 3 times. The capacitor assembly 9 was immersed into the insulation material 12 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 13

1 g

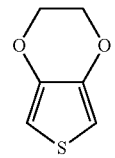

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 13.

0.2 g alumina was dispersed in 20 g water to give the insulation material 13.

The capacitor assembly 9 as shown in FIG. 1 was immersed in the insulation material 13 for 5 minutes and was taken out and heated to dryness at the temperature of 130° C. The previous steps were repeated for 3 times. The capacitor assembly 9 was immersed into the conductive polymer material 13 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 14

1 g

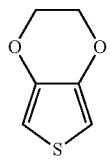

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 14.

0.2 g indium tin oxide was dispersed in 20 g water to give the insulation material 14.

The capacitor assembly 9 as shown in FIG. 1 was immersed in the conductive polymer material 14 for 5 minutes and was taken out and heated to dryness at the temperature of 130° C. The previous steps were repeated for 3 times. The capacitor assembly 9 was immersed into the insulation material 14 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 15

1 g

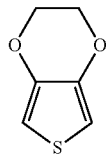

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 15

0.1 g zinc oxide was dispersed in 20 g water to give the insulation material 15.

The capacitor assembly 9 as shown in FIG. 1 was immersed in the insulation material 15 for 5 minutes and was taken out and heated to dryness at the temperature of 130° C. The previous steps were repeated for 3 times. The capacitor assembly 9 was immersed into the conductive polymer material 15 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 16

1 g

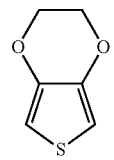

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 16.

0.1 g polyacrylamide was dissolved in 20 g water to form a solution, and 0.5 g zinc oxide was dispersed in the solution to give the insulation material 16.

The capacitor assembly 9 as shown in FIG. 1 was immersed in the conductive polymer material 16 for 5 minutes and was taken out and heated to dryness at the temperature of 130° C. The previous steps were repeated for 3 times. The capacitor assembly 9 was immersed into the insulation material 16 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 17

1 g

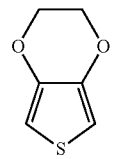

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 17.

0.2 g polyvinyl alcohol was dissolved in 20 g water to form a solution, and 0.5 g silica was dispersed in the solution to give the insulation material 17.

The capacitor assembly 9 as shown in FIG. 1 was immersed in the insulation polymer material 17 for 5 minutes and was taken out and heated to dryness at the temperature of 130° C. The previous steps were repeated for 3 times. The capacitor assembly 9 was immersed into the conductive polymer material 17 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 18

1 g

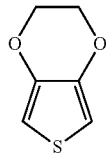

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 18.

0.2 g polyurethane was dissolved in 10 g tetrahydrofuran to form a solution, and 0.5 g alumina was dispersed in the solution to give the insulation material 18.

The capacitor assembly 9 as shown in FIG. 1 was immersed in the conductive polymer material 18 for 5 minutes and was taken out and heated to dryness at the temperature of 130° C. The previous steps were repeated for 3 times. The capacitor assembly 9 was immersed into the insulation material 18 for 5 minutes and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 19

1 g

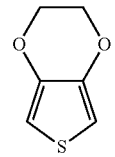

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 19.

0.2 g carboxymethyl cellulose was dissolved in 20 g water to form a solution, and 0.5 g indium tin oxide was dispersed in the solution to give the insulation material 19.

The capacitor assembly 9 as shown in FIG. 1 was immersed in a mixture solution of the conductive polymer material 19 and the insulation material 19 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Example 20

1 g

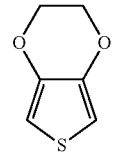

was added into 0.3 g polystyrenesulfonic acid in 100 ml water and stirred uniformly and then was subjected to supersonic vibration at 30 kHz for 30 minutes. 1.55 g hydrogen peroxide was added for oxidation polymerization to form a polymer material. The polymer material was subjected to supersonic vibration at 30 KHz for 30 minutes to give the conductive polymer material 20.

0.2 g carboxymethyl cellulose was dissolved in 20 g water to form a solution, and 0.5 g zinc oxide was dispersed in the solution to give the insulation material 20.

The capacitor assembly 9 as shown in FIG. 1 was immersed in a mixture solution of the conductive polymer material 20 and the insulation material 20 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Comparative Example 1

1 g

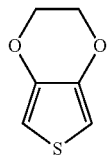

was added into 3.3 g polystyrenesulfonic acid in 100 ml water and stirred uniformly and then subjected to supersonic vibration at 30 kHz for 30 minutes. 1.55 g hydrogen peroxide was added for oxidation polymerization to form a polymer composite. The polymer material was subjected to supersonic vibration at 30 KHz for 30 minutes to give the conductive polymer material 21.

The capacitor assembly 9 as shown in FIG. 1 was immersed in a mixture solution of the conductive polymer material 21 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Comparative Example 2

0.9 g

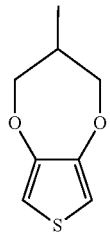

and 0.1 g

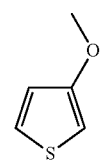

were added into 3.3 g polystyrenesulfonic acid in 100 ml water and stirred uniformly and then subjected to supersonic vibration at 30 kHz for 30 minutes. 1.55 g hydrogen peroxide was added for oxidation polymerization to form a polymer composite. The polymer material was subjected to supersonic vibration at 30 KHz for 30 minutes to give the conductive polymer material 22.

The capacitor assembly 9 as shown in FIG. 1 was immersed in the conductive polymer material 22 for 5 minutes and was taken out and heated to dryness at the temperature of 130° C. The previous steps were repeated for 3 times. A solid electrolyte was formed.

The preparation of the solid capacitor is completed by placing the capacitor assembly 9 comprising the solid electrolyte into a box having a bottom, followed by sealing the box and exposing the wire.

Testing for Physical Properties of the Solid Capacitor

The capacity of the resulting solid capacitor was measured at a temperature of 20° C. and a frequency of 120 Hz by HP4284A LCR gauge. The Chroma Model 11200 capacitor leakage current/insulation resistance gauge was used to measure the withstand voltage and properties of the resulting solid capacitor. The results of the measurement are listed in table 1.

TABLE 1

| | Capacity Storage (CS) (µF, 120 Hz) | Withstand Voltage |
|---|---|---|
| Example 1 | 6.5 | 276 |
| Example 2 | 6.3 | 278 |
| Example 3 | 6.8 | 288 |
| Example 4 | 6.6 | 285 |
| Example 5 | 6.2 | 290 |
| Example 6 | 6.1 | 270 |
| Example 7 | 5.7 | 272 |
| Example 8 | 6.3 | 270 |
| Example 9 | 5.8 | 280 |
| Example 10 | 6.0 | 283 |
| Example 11 | 5.9 | 281 |
| Example 12 | 6.2 | 275 |
| Example 13 | 6.1 | 280 |
| Example 14 | 6.9 | 270 |
| Example 15 | 7.0 | 270 |
| Example 16 | 5.7 | 285 |
| Example 17 | 6.1 | 276 |
| Example 18 | 5.9 | 276 |
| Example 19 | 6.5 | 272 |
| Example 20 | 6.8 | 275 |
| Comparative Example 1 | 5.1 | 185 |
| Comparative Example 2 | 5.2 | 190 |

It can be seen from the results of Examples 1 to 20 and Comparative Examples 1 to 2 that the solid capacitors comprising an insulation material exhibit a high capacity and a high withstand voltage.

What is claimed is:

1. A solid capacitor produced by a process comprising
   (a) forming a capacitor assembly comprising an anode, a cathode and a dielectric layer formed on the anode;
   (b) providing a conductive material formulation comprising a plurality of separate components including:
      (i) a first solution comprising a conductive polymer material, and
      (ii) a second solution comprising an insulation material, wherein the conductive polymer material is derived from a conductive polymer and polyanion, wherein the conductive polymer comprises a polymerization unit derived from a monomer of formula (I):

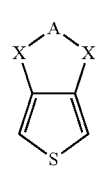

wherein

A is $C_1$ to $C_4$ alkylene substituted with $(R)_p$,

X is O or S,

R is H, unsubstituted or substituted $C_1$ to $C_{20}$ alkyl or alkoxy, or unsubstituted or substituted $C_6$ to $C_{20}$ aryl, and p is 0, 1 or 2, and the conductive polymer has a weight average molecular weight in the range of 3,000 to 30,000, wherein the (ii) insulation material is selected from the group consisting of an inorganic oxide, a non-conjugated polymer and a combination thereof, the inorganic oxide is selected from the group consisting of titanium dioxide, alumina, zinc oxide, indium tin oxide and silica, and the non-conjugated polymer is selected from the group consisting of epoxy monomer, epoxy oligomer, epoxy resin, polyethylene, polypropylene, polyvinyl alcohol, polyvinyl chloride, polyurethane, polyimide, carboxymethyl cellulose, polyethylene glycol, polyacrylamide and polytetrafluoroethene (Teflon); and wherein the (ii) insulation material has a content of about 0.01 to about 50 parts by weight, based on 100 parts by weight of the (i) conductive polymer material;

(c) immersing the capacitor assembly in the second solution of the conductive material formulation and heating to drying to form insulation material layers respectively on the cathode and the dielectric layer; and (d) immersing the capacitor assembly with the insulation material layers in the first solution of the conductive material formulation and heating to drying to form a conductive polymer material layer between the insulation material layers.

2. A solid capacitor produced by a process comprising (a) forming a capacitor assembly comprising an anode, a cathode and a dielectric layer formed on the anode;

(b) providing a conductive material formulation comprising a plurality of separate components including:

(i) a first solution comprising a conductive polymer material, and (ii) a second solution comprising an insulation material, wherein the conductive polymer material is derived from a conductive polymer and polyanion, wherein the conductive polymer comprises a polymerization unit derived from a monomer of formula (I):

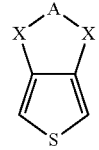

(I)

wherein

A is $C_1$ to $C_4$ alkylene substituted with $(R)_p$,

X is O or S,

R is H, unsubstituted or substituted $C_1$ to $C_{20}$ alkyl or alkoxy, or unsubstituted or substituted $C_6$ to $C_{20}$ aryl, and p is 0, 1 or 2, and the conductive polymer has a weight average molecular weight in the range of 3,000 to 30,000, wherein the (ii) insulation material is selected from the group consisting of an inorganic oxide, a non-conjugated polymer and a combination thereof, the inorganic oxide is selected from the group consisting of titanium dioxide, alumina, zinc oxide, indium tin oxide and silica, and the non-conjugated polymer is selected from the group consisting of epoxy monomer, epoxy oligomer, epoxy resin, polyethylene, polypropylene, polyvinyl alcohol, polyvinyl chloride, polyurethane, polyimide, carboxymethyl cellulose, polyethylene glycol, polyacrylamide and polytetrafluoroethene (Teflon); and wherein the (ii) insulation material has a content of about 0.01 to about 50 parts by weight, based on 100 parts by weight of the (i) conductive polymer material;

(c) immersing the capacitor assembly in the first solution of the conductive material formulation and heating to drying to form conductive polymer layers respectively on the cathode and the dielectric layer; and (d) immersing the capacitor assembly with conductive polymer layers in the second solution of the conductive material formulation and heating to drying to form an insulation material layer between the conductive polymer layers.

* * * * *